No. 669,790. Patented Mar. 12, 1901.
A. H. HAMPE.
SPEED REGULATOR.
(Application filed Oct. 23, 1899.)
(No Model.) 2 Sheets—Sheet 2.
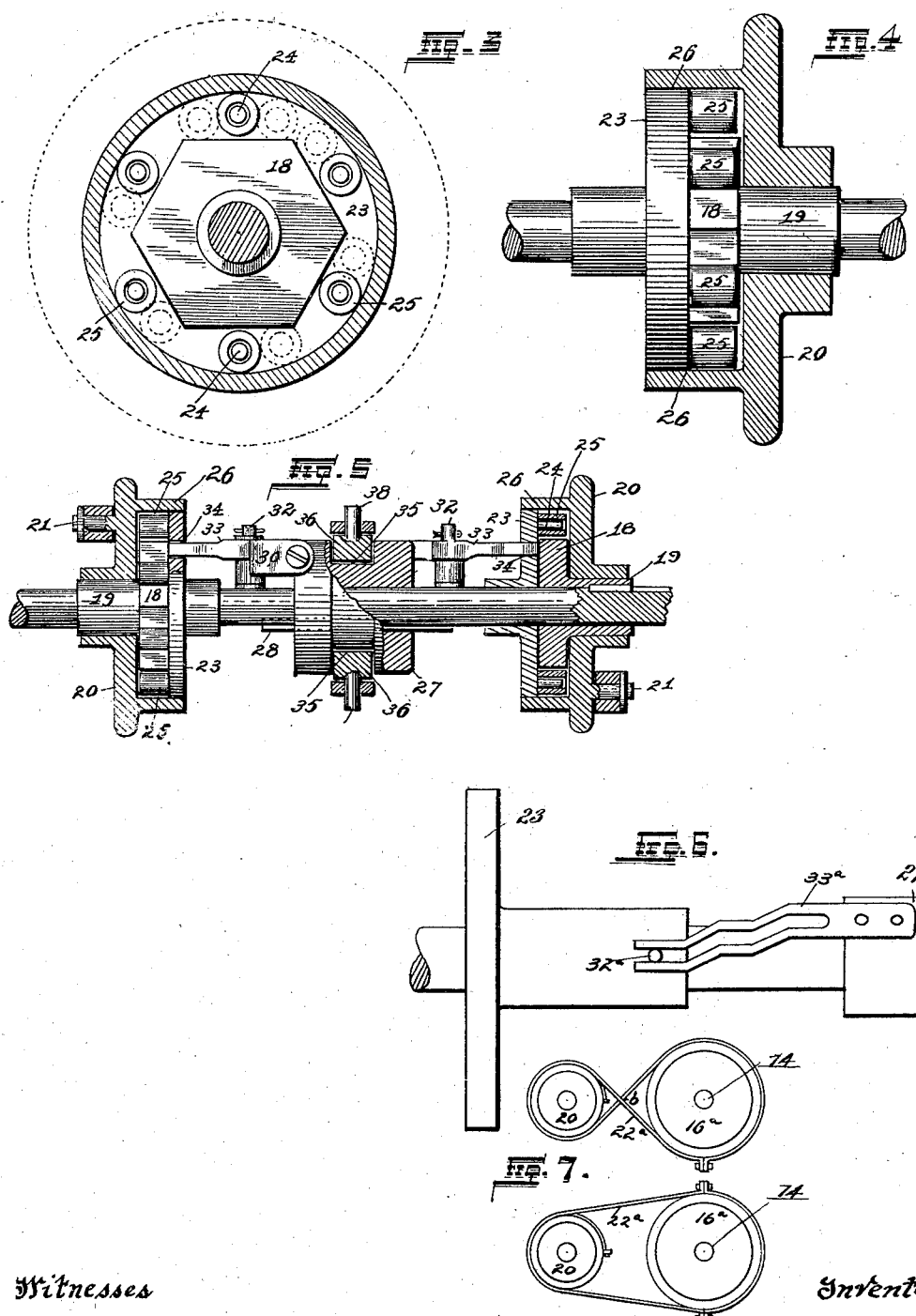

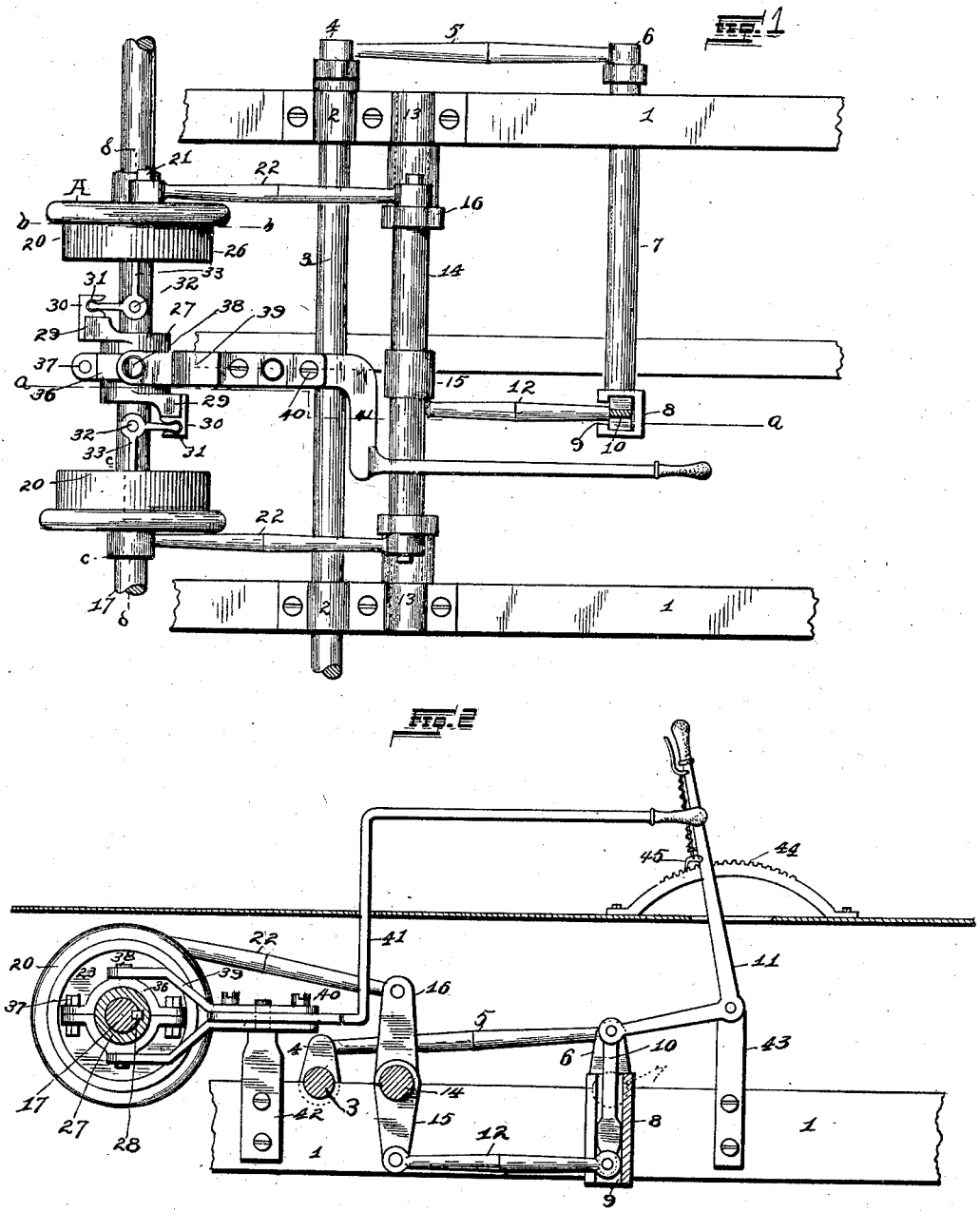

UNITED STATES PATENT OFFICE.

ALBERT H. HAMPE, OF ST. LOUIS, MISSOURI, ASSIGNOR OF ONE-HALF TO THE H. D. SEEKAMP MACHINE CO., OF SAME PLACE.

SPEED-REGULATOR.

SPECIFICATION forming part of Letters Patent No. 669,790, dated March 12, 1901.

Application filed October 23, 1899. Serial No. 734,579. (No model.)

*To all whom it may concern:*

Be it known that I, ALBERT H. HAMPE, of the city of St. Louis, State of Missouri, have invented certain new and useful Improvements in Speed-Regulators, of which the following is a full, clear, and exact description, reference being had to the accompanying drawings, forming a part hereof.

My invention relates to speed-regulators; and it consists of the novel construction, combination, and arrangement of parts, hereinafter shown, described, and claimed.

The object of this invention is to construct an improved variable-speed regulator having a reversing attachment by means of which the direction of the motion generated can be changed whenever desired, said speed-regulator being applicable to any kind of engine or motor such as used in automobiles and on railways and to such machines and appliances where the frequent change of speed is a necessity.

Figure 1 is a top plan view of my invention. Fig. 2 is a cross-sectional view on the line *a a* of Fig. 1. Fig. 3 is a sectional view of the wheel A in Fig. 1 on the line *b b*. Fig. 4 is a sectional view on the line *c c*. Fig. 5 is a longitudinal sectional view on the line *d d* in Fig. 1. Fig. 6 is a modification of a part of the gearing apparatus shown in Fig. 5. Fig. 7 is a modification of a part of the reciprocating mechanism shown in Fig. 1.

In the construction of my invention I provide a supporting-framework consisting of suitable sills or beams 1. Upon this framework 1 and journaled in suitable bearings 2 is the driving-shaft 3, upon one end of which and outside the framework is rigidly fixed the crank 4. A pitman-rod 5 is pivoted to the crank 4 and connects the same with another crank 6, which is rigidly attached to the outer end of a shaft 7. The crank 6 is constructed longer than the crank 4 in order to convert the rotary motion of the crank 4 into a rocking motion in the crank 6 and shaft 7. A hollow crank-arm 8, having a slot 9 on its rear side, is rigidly secured to the inner end of the shaft 7. Within the hollow crank-arm 8 is a rod 10, which is pivoted at its upper end to the regulating-lever 11 and at its lower end and within the crank-arm 8 to the connecting-rod 12. Journaled in suitable bearings 13, located upon the framework 1 and in front of the bearings 2, is the shaft 14. Immediately behind the hollow crank-arm 8 and firmly secured to the shaft 14 is the downwardly-extending crank-arm 15, to which the connecting-rod 12 is pivoted. Near each of the ends of the shaft 14 is an upwardly-extending crank-arm 16, both of which are rigidly secured to said shaft 14.

On the rear axle 17 of the vehicle a suitable distance apart are rigidly secured the hexagonal plates 18. Rotatably secured over the outwardly-extending hub 19 of the plates 18 are the pulleys 20, integral with each of which is an outwardly-extending pintle 21. A connecting-rod 22 is pivoted to each of these pintles and to the upwardly-extending crank-arms 16, one of the pintles 21 being above the axle 17 and one beneath said axle. A disk 23 is on the axle 17 on the inner side of each of the hexagonal plates 18. Integral with the disks 23, near their edges, are the outwardly-extending roller-pins 24, on each of which is rotatably secured a roller 25. One of these roller-pins and rollers is provided for each of the sides of the hexagonal plates 18. The pulleys 20 are cylindrical on their inner side, the cylinder 26 extending inwardly to encircle the disk 23 and fitting on the periphery of said disk and against the rollers 25, as shown in Fig. 4.

On the axle 17, midway between the disks 23, is a shifter 27. The shifter 27 is non-rotatable on the axle 17, but is allowed a horizontal movement by means of a metallic key 28, which fits into a mortise on the axle 17 and into a groove on the inner surface of the shifter 27. On the shifter 27 are the two flanges 29, extending in opposite directions. To each of the flanges 29 is attached an angular projection 30, in each of which is a pocket 31.

Integral with the axle 17, on each side of the shifter 27, is an upwardly-extending lug 32. A bell-crank 33 is pivoted to each of the lugs 32. One projection of the cranks 33 fits into the pocket 31 and the other projection fits into an aperture 34 in the wheel 23. A groove 35 extends around the shifter 27. Into said groove 35 are placed the clips 36, which are secured by means of the bolts 37. Integral with the clips 36 are the lugs 38, to which are pivoted the angular strips 39, which extend forwardly and are attached, by means of bolts 40, to the lever 41. The strips 39 and the lever 41 are pivoted to the upwardly-extending arm 42, suitably secured to the framework 1. The lever 41 extends forwardly a suitable distance upwardly through an aperture in the vehicle-bed and there may be arranged in any manner desired. The operating-lever 11 extends forwardly a suitable distance and is fulcrumed to the arm 43, suitably secured to the framework 1. Thence it extends vertically through an aperture in the bottom of the vehicle-bed and may be retained in any position desired by the ratchet 44 and the pawl 45.

Fig. 6 shows a modification of some of the gearing apparatus shown in Fig. 5. The lugs 32 and the levers 33 do not appear. To the shifter 27 is rigidly attached the bifurcated strip 33$^a$, angled at suitable distances, and between the forks of which is a lug 32$^a$, integral with the inwardly-extending hub of the disk 23. The result obtained through the operation of each is the same.

Fig. 7 shows a modification of some of the reciprocating apparatus shown in Fig. 1. On the shaft 14, instead of the upwardly-extending crank-arms 16, are the pulleys 16$^a$, rigidly secured to said shaft. A belt 22$^a$, taking the place of the rods 22, passes around each of the pulleys 16$^a$ and the pulleys 20. One of these belts 22$^a$ is made to cross at $b$, thereby giving to the pulleys 20 the same reciprocating movement as was given by the rods. The belts are each provided with a means by which it can be drawn more tightly when desired. The result obtained through the operation of each is the same.

The operation of my invention is as follows: The driving-shaft 3 is rotated by the motive power, and the rotary motion is transformed into a reciprocating motion in the shaft 7 by means of the pitman-rod 5. Thence it is transferred to the shaft 14 by means of the connecting-rod 12. The extent of the reciprocating movement of the rod 12 may be increased or diminished by means of the rod 10, which can be raised or lowered in the hollow crank-arm 8 by means of the lever 11. When it is raised, the radius of the movement of the rod 10 would be shorter, and hence the movement itself would extend over less space. The reciprocating movement is transferred from the shaft 14 to the pulleys 20 by means of the rods 22. When it is desired to move the vehicle, the lever 41 is moved horizontally, and this moves the shifter 27 horizontally on the axle 17, and the wheels 23 are rotated by means of the bell-cranks 33 throwing the rollers 25 against the angles of the hexagonal plates 18, as indicated by dotted lines in Fig. 3. These may be thrown to one angle by moving the shifter 27 to the right and to the other angle by moving said shifter to the left. When the cylinders 25 are thus positioned, they perform the function of pallets through the reciprocating movement of the pulleys 20. They operate against the angles of the hexagonal plates 18 and give to them and to the axle 17 a continuous rotary motion. The wheels of the vehicle are rigidly attached to the axle 17, and hence they are rotated with the axle. When it is desired to stop the vehicle, the cylinders 25 are removed from the angles of the hexagonal plates 18, and hence no rotary motion is given to the axle 17 and the vehicle remains stationary.

I claim—

The improved speed-regulating device, comprising a suitable frame, a driving-shaft 3 having a crank 4 at one of its ends and mounted upon said frame, a rock-shaft 7 mounted upon said frame parallel with said driving-shaft, a crank 6 carried by said rock-shaft, a pitman-rod 5 arranged to connect said crank 4 to said crank 6, the latter having a longer throw than said crank 4 in order to convert the rotary motion of the latter into a rocking movement for the crank 6 and shaft 7, a hollow crank-arm 8 having a slot 9 in one side and rigidly secured to said shaft 7, an additional rock-shaft 14 having the downwardly-extending crank-arm 15, a rod 10 mounted within said hollow crank-arm 8, a connecting-rod 12 pivoted at one end to said rod 10 at a point within said hollow crank-arm, and said connecting-rod 12 connected at its opposite end to the said crank-arm 15, a regulating-lever 11 pivotally connected to the upper end of said rod 10, upwardly-extending crank-arms 16 mounted one near each of the ends of said shaft 14, the driven shaft or axle 17 arranged parallel with said last-mentioned shaft, two reversing-clutches mounted upon said driven shaft 17, a pair of connecting-rods 22 connected at one end to the said crank-arms 16 on the said rock-shaft 14 and secured at their opposite ends to said clutches, a controlling-lever 41, and suitable connections intermediate of said controlling-lever and said clutches whereby the latter are operated to stop, start and impart forward or reverse movements to said driven shaft 17, substantially as herein specified.

In testimony whereof I affix my signature in presence of two witnesses.

ALBERT H. HAMPE.

Witnesses:
 JOHN C. HIGDON,
 JOHN D. RIPPEY.